United States Patent
Dwyer

(10) Patent No.: US 8,065,915 B2
(45) Date of Patent: *Nov. 29, 2011

(54) MEMS ACCELEROMETER

(75) Inventor: Paul W. Dwyer, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 501 days.

This patent is subject to a terminal disclaimer.

(21) Appl. No.: 12/247,921

(22) Filed: Oct. 8, 2008

(65) Prior Publication Data

US 2010/0083760 A1 Apr. 8, 2010

(51) Int. Cl.
*G01P 15/08* (2006.01)
(52) U.S. Cl. .................................. 73/514.31
(58) Field of Classification Search .......... 73/514.31, 73/514.21, 514.22, 514.23, 514.32, 514.36, 73/514.37, 514.12, 514.13
See application file for complete search history.

(56) References Cited

U.S. PATENT DOCUMENTS

| | | | | | |
|---|---|---|---|---|---|
| 3,965,753 | A | * | 6/1976 | Browning, Jr. | 73/504.18 |
| 4,088,027 | A | | 5/1978 | Hernandez et al. | |
| 4,144,765 | A | * | 3/1979 | Aske | 73/514.24 |
| 4,510,802 | A | | 4/1985 | Peters | |
| 4,726,228 | A | | 2/1988 | Norling | |
| 4,854,169 | A | | 8/1989 | Sakuma et al. | |
| 4,868,479 | A | * | 9/1989 | Byong-Ho et al. | 318/721 |
| 5,133,214 | A | * | 7/1992 | Hanson et al. | 73/514.21 |
| 5,359,286 | A | * | 10/1994 | Kaiser et al. | 324/207.2 |
| 5,524,488 | A | * | 6/1996 | Foote | 73/514.23 |
| 5,731,703 | A | | 3/1998 | Bernstein et al. | |
| 5,739,431 | A | | 4/1998 | Petri | |
| 5,959,207 | A | | 9/1999 | Letrondo | |
| 6,203,060 | B1 | | 3/2001 | Cech et al. | |
| 6,664,786 | B2 | | 12/2003 | Kretschmann et al. | |
| 6,776,042 | B2 | | 8/2004 | Pike et al. | |
| 7,191,654 | B2 | * | 3/2007 | Dwyer et al. | 73/514.23 |
| 7,303,935 | B2 | | 12/2007 | DeNatale et al. | |
| 7,346,981 | B2 | | 3/2008 | Borwick, III et al. | |
| 2005/0097959 | A1 | | 5/2005 | Pike et al. | |
| 2010/0083759 | A1 | * | 4/2010 | Dwyer et al. | 73/514.31 |

FOREIGN PATENT DOCUMENTS

WO 9619733 6/1996

* cited by examiner

*Primary Examiner* — Helen C. Kwok
(74) *Attorney, Agent, or Firm* — Lowe Graham Jones PLLC

(57) ABSTRACT

Microelectromechanical (MEMS) accelerometer and acceleration sensing methods. A MEMS accelerometer includes a proof mass suspended by at least one hinge type flexure, at least one planar coil located on the proof mass, and at least one magnet positioned such that a magnetic flux field passes through the at least one planar coil at an angle between approximately 30 degrees and approximately 60 degrees relative to the coil plane. In an example embodiment, the angle is approximately 45 degrees. The at least one magnet may include a first annular magnet positioned on a first side of the proof mass and a second annular magnet positioned on a second side of the proof mass. A method includes sensing a capacitance of a pickoff in the MEMS accelerometer and rebalancing the MEMS accelerometer by sending a current through the planar coil.

12 Claims, 3 Drawing Sheets

MEMS ACCELEROMETER

BACKGROUND OF THE INVENTION

Typical configurations for microelectromechanical (MEMS) accelerometers that have a paddle type proof mass with a coil have a magnetic circuit configuration with a large reluctance value. Generally, previous coil and magnetic circuit configurations are structured such that a magnetic field runs parallel with the plane of a spiral coil. The magnetic field excites a return path that penetrates a proof mass using holes. A gap in the magnetic return path with this configuration is defined by a diameter of the coil, and is thus relatively large with a corresponding large reluctance of the magnetic circuit which results in a high scale factor. This type of coil configuration requires a level of current to servo the accelerometer that generates heating effects that create nonlinearities which degrade performance.

SUMMARY OF THE INVENTION

The present invention is a microelectromechanical (MEMS) accelerometer and acceleration sensing methods having improved sensitivity, a greater signal to noise ratio, and lower power requirements. An example MEMS accelerometer includes a proof mass suspended by at least one hinge type flexure, at least one planar coil located on the proof mass, and at least one magnet positioned such that a magnetic flux field passes through the at least one planar coil at an angle between approximately 30 degrees and approximately 60 degrees relative to the coil plane. In an example embodiment, the angle is approximately 45 degrees.

In accordance with one aspect of the invention, the at least one magnet includes at least one annular magnet.

In accordance with additional aspects of the invention, the at least one magnet includes a first annular magnet positioned on a first side of the proof mass and a second annular magnet positioned on a second side of the proof mass. The second annular magnet has an inner diameter smaller than an inner diameter of the first annular magnet and an outer diameter smaller than an outer diameter of the first annular magnet.

In accordance with yet other aspects of the invention, the at least one planar coil includes a first planar coil located on a first side of the proof mass and a second planar coil located on a second side of the proof mass.

In accordance with still further aspects of the invention, a method includes sensing a capacitance of a pickoff in the MEMS accelerometer and rebalancing the MEMS accelerometer by sending a current based on the sensed capacitance through the planar coil.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
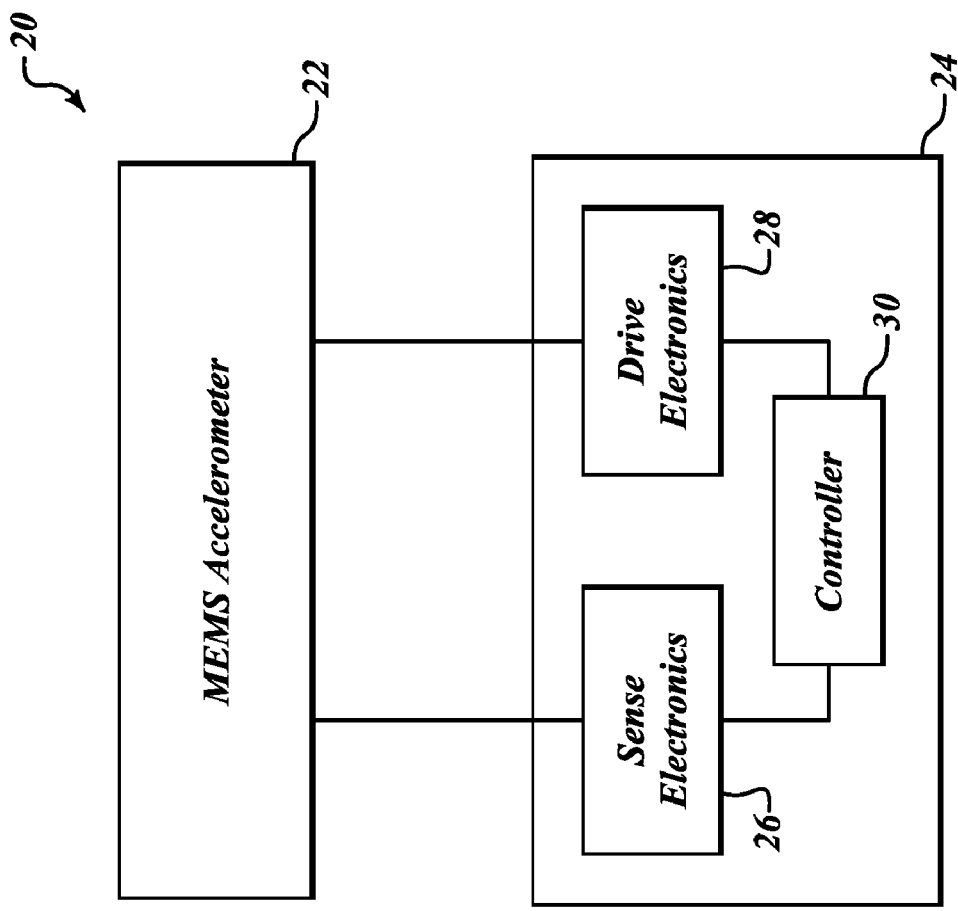
FIG. 1 is a block diagram of a microelectromechanical (MEMS) accelerometer system formed in accordance with an embodiment of the invention.

FIG. 1 is a block diagram of a microelectromechanical (MEMS) accelerometer system 20 formed in accordance with an embodiment of the invention. The MEMS accelerometer system 20 includes an accelerometer 22 and a control unit 24. The control unit 24 includes a sense electronics component 26 and a drive electronics component 28, both in signal communication with the MEMS accelerometer 22. The control unit 24 also includes a controller 30 in signal communication with the sense electronics component 26 and the drive electronics component 28. Generally, the accelerometer 22 includes a proof mass suspended by at least one hinge type flexure within a housing and a magnetic rebalancing component for rebalancing the proof mass about the at least one hinge type flexure. The magnetic rebalancing component makes use of the Lorentz force to servo actuate the accelerometer 22 by passing a current through at least one planar coil located on the proof mass that lies within a magnetic flux field that passes at an angle between approximately 30 degrees and approximately 60 degrees relative to the coil plane through the at least one planar coil. A magnetic shield may be present around the accelerometer 22 and/or the accelerometer system 20 in some embodiments for use in a multi-sensor environment. Additional detail for example embodiments of the accelerometer 22 is discussed with respect to FIG. 2.

Figure 2:
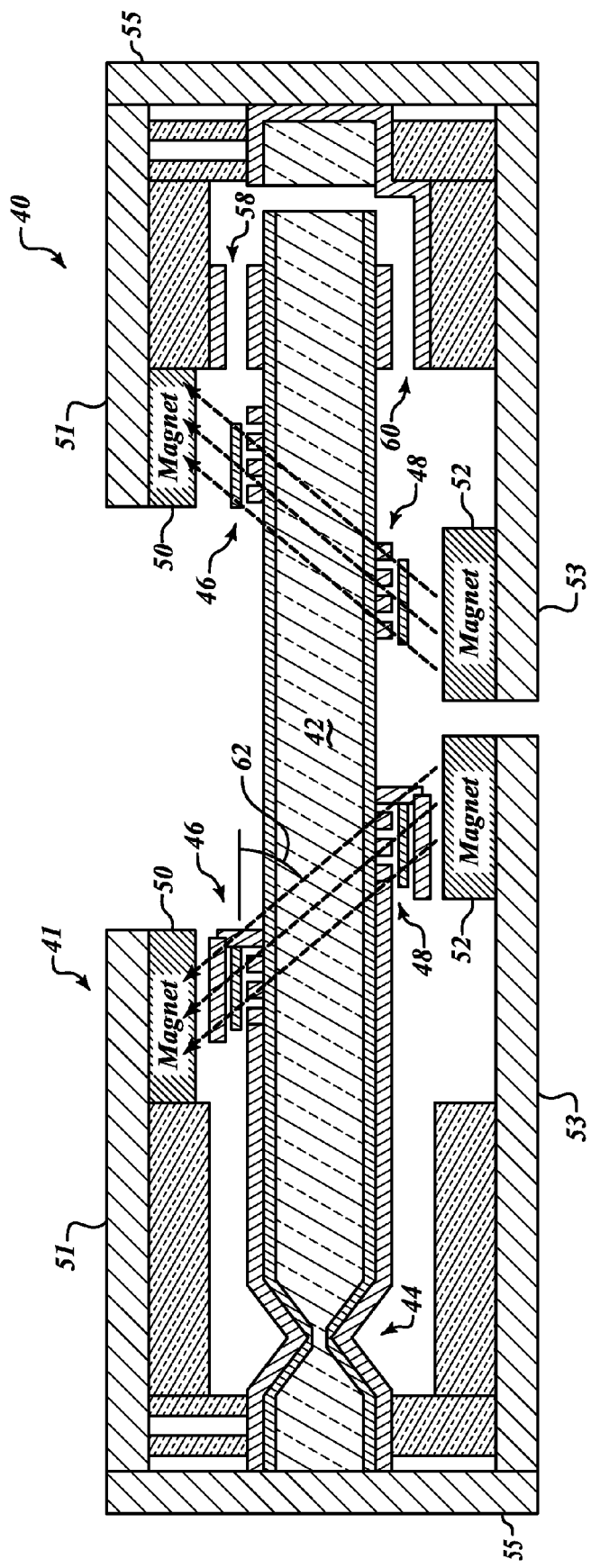
FIG. 2 is a diagram of a cross-sectional side view of a MEMS accelerometer formed in accordance with an example embodiment of the invention.

FIG. 2 is a cross-sectional side view of a MEMS accelerometer 40 formed in accordance with an example embodiment of the invention. The accelerometer 40 includes a magnetic return path housing structure 41. A proof mass 42 is suspended by a hinge type flexure 44 that is supported by a supporting means within the magnetic return path housing structure 41. A first coil 46 is located on a first side of the proof mass 42. A second coil 48 is located on a second side of the proof mass 42. The first and second coils 46, 48 are planar, circular coils centered about a common axis. The first coil 46 has a first coil inner diameter and a first coil outer diameter respectively larger than a second coil inner diameter and a second coil outer diameter of the second coil 48. In an example embodiment, each of the first and second coils 46, 48 have approximately 10 turns that are each approximately 45 microns wide with a spacing between turns of approximately 15 microns and a thickness of approximately 0.5 microns. However, other coil configurations such as oval or rectangular spirals may be used and different numbers of turns and dimensions may be used in some embodiments. A first annular magnet 50 is located on an inner surface of a top piece 51 of the magnetic return path housing structure 41 above the first coil 46. A second annular magnet 52 is located on an inner surface of a base piece 53 of the magnetic return path housing structure 41 below the second coil 48. The first and second magnets 50, 52 may be Samarium Cobalt (SmCo) magnets, for example. The magnetic return path housing structure 41 extends from the top piece 51 above the first magnet 50 and wraps to a position below the second magnet 52 at the base piece 53 through a sidewall ring 55 that is attached to both the top piece 51 and the base piece 53. The magnetic return path housing structure 41 may be formed of an alloy such as alloy 39, for example. Although alloy 39 mentioned because it is magnetic and has a good thermal coefficient of expansion match to silicon that minimizes warping with temperature variation, other materials may be used in other embodiments. A first capacitive pickoff 58 and a second capacitive pickoff 60 are respectively located above and below the proof mass 42.

The first magnet 50 and the second magnet 52 are polarized such that a magnetic flux field is created through the first coil 46 and the second coil 48 in a direction shown by the dashed arrows at a flux angle 62 of approximately 45 degrees relative to the planes of the first and second coils 46, 48. Although a cross-section of the flux field may have some curvature, the flux field is preferably approximately linear through the planes of the first and second coils 46, 48. The magnetic field can be described with respect to a first component in the planes of the first and second coils 46, 48 and a second component orthogonal to the planes of the first and second coils 46, 48. The first component in the planes of the coils 46, 48 is used in conjunction with a current passed through the coils 46, 48 to provide useful force in a servo direction normal to the plane of the proof mass. The second component, in conjunction with the current passed through the coils 46, 48, applies a radial force to the coils 46, 48 that is supported by the coils 46, 48 and the proof mass 42. A layer of pyrex (not shown) may be used to separate the first and/or second magnets 50, 52 from the proof mass 42 and coils 46, 48 in some embodiments to seal some components of the accelerometer 40 before the magnets 50, 52 and the magnetic return path housing structure 41 are attached.

The first magnet 50 and the second magnet 52 are charged at an angle that will result in an approximately linear flux angle of approximately 45 degrees relative to a surface of the magnets 50, 52 that will face the first and second coils 46, 48. In an example embodiment, the magnets 50, 52 are charged radially inward about the central axis of the annular magnets 50, 52 at an angle of approximately 90 degrees relative to a surface of each magnet 50, 52 that faces the first coil 46 and second coil 48, respectively. The direction in which the magnets 50, 52 are to be charged to create a flux angle of approximately 45 degrees may be determined by using finite element analysis modeling of the magnets and their positions relative to each other and other parts in the accelerometer 40 in an example embodiment. The first and second magnets 50, 52 are bonded to the top piece 51 and the base piece 53 so that the direction vectors of the flux lines of each magnet 50, 52 coincide. A component of the magnetic flux field in a direction perpendicular to a central axis of the first and second coils 46, 48 is used to servo the proof mass 42 of the accelerometer 40. In an example embodiment, this helps to reduce heating effects as compared to typical configurations because a cross-product of the current passed through the first and second coils 46, 48 and the component of the magnetic flux field perpendicular to the central axis of the coils 46, 48 is composed of more flux and less current than in typical configurations. Although the magnets 50, 52 are shown with different radii, magnets with approximately equal inner and outer radii may be used in other embodiments. In such embodiments, the charging angle of the magnets may be approximately 45 degrees rather than approximately 90 degrees so that the desired 45 degree flux angle 62 passes through the coils 46, 48.

In an example embodiment, the first and second coils 46, 48 are electrically connected to a driving component, such as the drive electronics 28 shown in FIG. 1. The first and second capacitive pickoffs 58, 60 are in signal communication with a sensing component, such as the sense electronics 26 shown in FIG. 1. Other components (not shown for clarity), such as a sensor package surrounding the accelerometer 40 may also be included.

The accelerometer 40 is sensitive to accelerations that have a component normal to the plane of the proof mass 42. This acceleration is sensed by the sense electronics 26 connected to the first and second capacitive pickoffs 58, 60. In some embodiments, a differential capacitance is sensed. An appropriate current is flowed through the first and second coils 46, 48 by the drive electronics 28 to produce a force that rebalances the accelerometer 40 based on the sensed capacitance. The controller 30 sends a drive signal to the drive electronics 28 based on a predetermined calibration and the sensed capacitance. The component of acceleration normal to the plane of the proof mass 42 is determined based on the level of current required to rebalance the proof mass 42.

Figure 3:
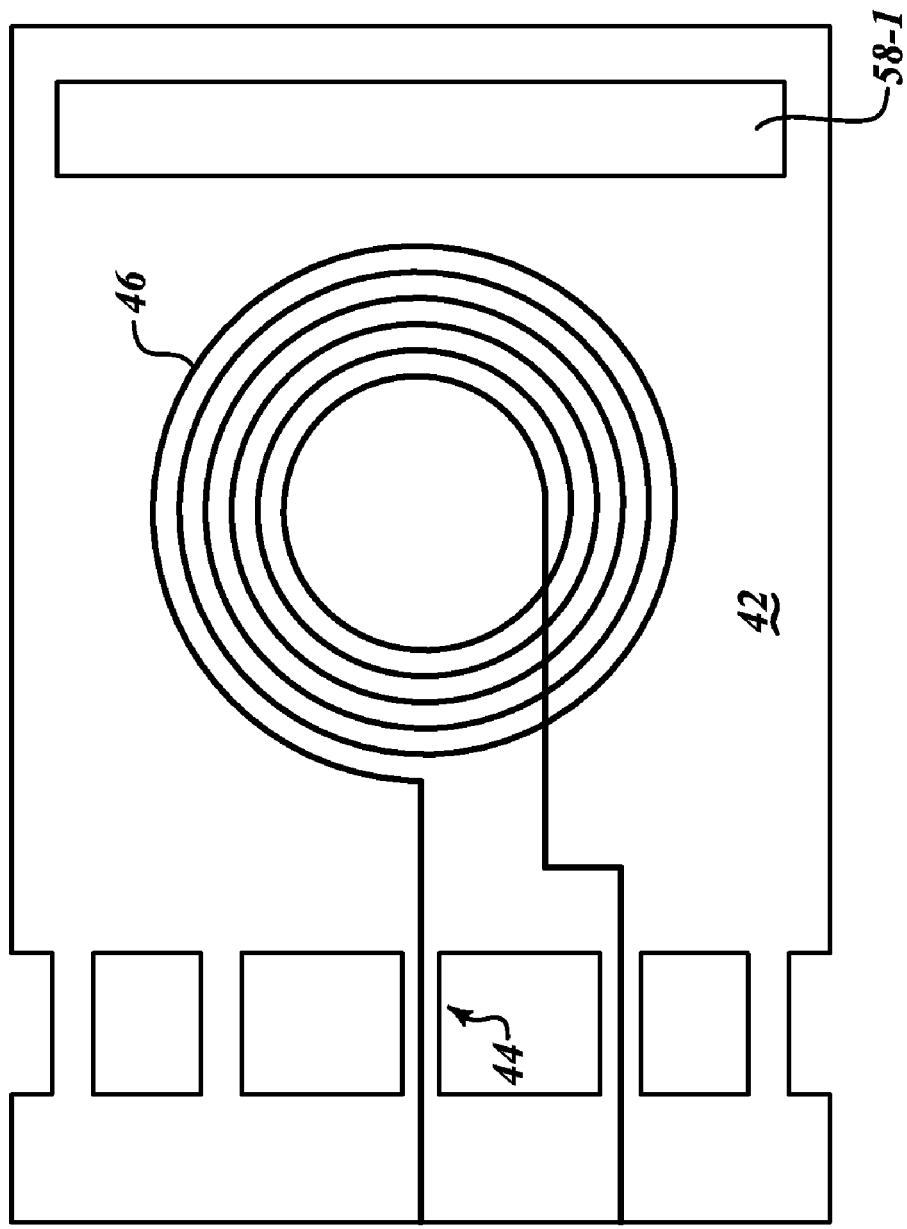
FIG. 3 is a cross-sectional top view of a proof mass formed in accordance with an embodiment of the invention.

FIG. 3 is a cross-sectional top view of the proof mass 42 shown in FIG. 2 formed in accordance with an example embodiment of the invention. The first coil 46, the hinge type flexure 44, and a first pad 58-1 of the capacitive pickoff 58 are also shown.

Generally, the accelerometers 22 and 40 are formed by starting with a silicon wafer that is patterned and etched to produce several pendulous proof mass elements with hinge type flexures attached to support structures. The wafer is then oxidized to produce a dielectric layer to support metallization. Further patterning and metallization steps create differential capacitive pickoffs and the basic element for a planar spiral coil. The inner trace of the coil is brought out via the placement of a dielectric layer across the spiral coil, followed by a second metallization step. Glass wafers with the same diameter as the silicon wafer are patterned, etched, and metallized to produce recesses in the surface that act at second plates of the differential capacitive pickoffs and further serve to control device damping. A first glass wafer is then aligned with the silicon wafer and anodically bonded to form the lower capacitor plates. This assembly is then anodically bonded to a second glass wafer to form the upper capacitors for the differential capacitive pickoff. The silicon and glass wafer assembly is then diced so that individual sensors can be accessed. A bottom magnet is attached to a base piece of a magnetic return path housing structure, a sidewall ring piece of the return path housing structure is attached to the base piece, a sensor from the wafer assembly is placed within the sidewall ring and attached to the base piece, a top magnet is attached to a top piece of the return path housing structure, and the top piece is attached to the sidewall ring. The magnets are then charged in a predetermined orientation that generates a flux field of approximately 45 degrees through the plane of the spiral coil. Alternatively, one or both of the magnets may be charged before attachment to the magnetic return path housing structure. The magnets are attached to the return path structure in such a way that the magnets are placed above and below the coil to create a magnetic field with which the spiral coil interacts. The accelerometer, including the wafer assembly, the magnets, and the magnetic return path housing structure is then ready for packaging, testing, and incorporation into an accelerometer system. Although only one coil is mentioned, it should be understood that additional coils, such as the second coil described with respect to FIG. 2 may also be added in similar fashion to the coil described above.

In an example embodiment, the accelerometers 22 and 40 of FIGS. 1-2 are formed by oxidizing a pattern and deep reactive ion etching (DRIE) a proof mass and at least one hinge type flexure on a silicon wafer. Next, a spiral coil and pickoffs are metallized on the proof mass. The spiral coil and pickoffs may be formed of gold, for example. Then, an insulating layer is sputtered across a portion of the coils. Next, an additional trace is metallized across the insulating layer to bring a connection to an inner part of the coils. Then, a first housing portion that may be made of a glass such as borosilicate Pyrex, for example, is etched to produce recesses for capacitors and through holes for access to traces on the proof mass. Then, the first housing portion is metallized to form a portion of the capacitive pickoffs. In similar fashion, a second housing portion is etched and metallized. The first and second housing portions are attached to the wafer layer that includes the proof mass, such as by anodically bonding the housing portions to the wafer layer. A through-hole may also be ultrasonically machined in the wafer assembly to create a hole for a pole piece and/or a return path structure in some embodiments.

While the preferred embodiment of the invention has been illustrated and described, as noted above, many changes can be made without departing from the spirit and scope of the invention. For example, rather than using two annular magnets, a plurality of individual magnets may be used on either side of the proof mass in some embodiments. Additionally, rather than using magnets that are polarized at an angle, one or more pole pieces may be used to direct the magnetic flux field to a desired angle through the coils. Also, rather than using a single magnetic return path structure, multiple return path structures may be used, particularly in embodiments where a plurality of magnets rather than annular magnets are used. Although only single layer coils are described, coils with more than one layer may also be used in some embodiments. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A microelectromechanical (MEMS) accelerometer comprising:
   a proof mass suspended by a hinge type flexure;
   at least one planar coil located on the proof mass, the at least one planar coil having a coil plane; and
   at least one magnet positioned such that a magnetic flux field passes through the at least one planar coil at a flux angle between approximately 30 degrees and approximately 60 degrees relative to the coil plane.

2. The MEMS accelerometer of claim 1, wherein the at least one magnet includes at least one annular magnet.

3. The MEMS accelerometer of claim 2, wherein the at least one magnet comprises:
   a first annular magnet positioned on a first side of the proof mass; and
   a second annular magnet positioned on a second side of the proof mass,
   wherein the second annular magnet has an inner diameter smaller than an inner diameter of the first annular magnet and an outer diameter smaller than an outer diameter of the first annular magnet.

4. The MEMS accelerometer of claim 1, further comprising a magnetic return path structure coupled to the at least one magnet.

5. The MEMS accelerometer of claim 4, wherein the magnetic return path structure extends from a first side of the proof mass to a second side of the proof mass.

6. The MEMS accelerometer of claim 1, wherein the at least one planar coil comprises:
   a first planar coil on a first side of the proof mass; and
   a second planar coil on a second side of the proof mass.

7. The MEMS accelerometer of claim 1, wherein the angle is approximately 45 degrees.

8. The MEMS accelerometer of claim 1, wherein the angle is between approximately 40 degrees and approximately 50 degrees.

9. A method of sensing acceleration with a MEMS accelerometer that includes a proof mass suspended by at least one hinge type flexure, at least one planar coil located on the proof mass, the at least one planar coil having a coil plane, and at least one magnet positioned such that a magnetic flux field passes through the at least one planar coil at a flux angle between approximately 30 degrees and approximately 60 degrees relative to the coil plane, the method comprising:
   sensing a capacitance of a pickoff in the MEMS accelerometer; and
   rebalancing the MEMS accelerometer by sending a current through the at east one planar coil such that the current passes through the magnetic flux field,
   wherein the current is based on the sensed capacitance.

10. The method of claim 9, wherein rebalancing includes sending a current through a first planar coil on a first side of the proof mass and through a second planar coil on a second side of the proof mass.

11. The method of claim 9, wherein sensing a capacitance of a pickoff in the MEMS accelerometer includes sensing a differential change in capacitance of a first pickoff and a second pickoff.

12. A microelectromechanical (MEMS) accelerometer comprising:
   a MEMS proof mass suspended by at least one hinge type flexure;
   a first planar coil located on a first side of the proof mass, the first planar coil having a first coil plane;
   a second planar coil located on a second side of the proof mass, the second planar coil having a second coil plane;
   a first annular magnet positioned on a first side of the proof mass;
   a second annular magnet positioned on a second side of the proof mass; and
   a magnetic return path structure coupled to the first annular magnet and the second annular magnet,
   wherein the first and second annular magnets are positioned such that a magnetic flux field passes through the first and second planar coils a flux angle of approximately 45 degrees relative to the first and second coil planes.

* * * * *